United States Patent
Bian (10) Patent No.: US 11,378,749 B2
(45) Date of Patent: Jul. 5, 2022

(54) OPTICAL POWER SPLITTERS WITH A MULTIPLE-LEVEL ARRANGEMENT

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/095,865

(22) Filed: Nov. 12, 2020

(65) Prior Publication Data
US 2022/0146751 A1   May 12, 2022

(51) Int. Cl.
G02B 6/28 (2006.01)
G02B 6/12 (2006.01)
G02B 6/122 (2006.01)

(52) U.S. Cl.
CPC .......... *G02B 6/2813* (2013.01); *G02B 6/122* (2013.01); *G02B 6/12014* (2013.01); *G02B 2006/1215* (2013.01); *G02B 2006/12061* (2013.01); *G02B 2006/12195* (2013.01)

(58) Field of Classification Search
CPC .. G02B 6/2813; G02B 6/12014; G02B 6/122; G02B 2006/12061; G02B 2006/12195; G02B 2006/1215
See application file for complete search history.

(56) References Cited

U.S. PATENT DOCUMENTS

| | | | |
|---|---|---|---|
| 8,532,447 B1 | 9/2013 | Kwakemaak et al. | |
| 9,817,186 B2 * | 11/2017 | Kamei | G02B 6/126 |
| 10,429,581 B1 | 10/2019 | Thomas et al. | |

OTHER PUBLICATIONS

Mu, X.; Wu, S.; Cheng, L.; Fu, H., "Edge Couplers in Silicon Photonic Integrated Circuits: A Review", Published Feb. 24, 2020, Appl. Sci. 10, 1538.
Chris J. Brooks, Andrew P. Knights, and Paul E. Jessop, "Vertically-integrated multimode interferometer coupler for 3D photonic circuits in SOI," Opt. Express 19, 2916-2921 (2011).
X. Sun, M. Z. Alam, J. S. Aitchison, and M. Mojahedi, "Compact and broadband polarization beam splitter based on a silicon nitride augmented low-index guiding structure," Opt. Lett. 41, 163-166 (2016).
Sebastian Romero-García, Florian Merget, Frank Zhong, Hod Finkelstein, and Jeremy Witzens, "Silicon nitride CMOS-compatible platform for integrated photonics applications at visible wavelengths," Opt. Express 21, 14036-14046 (2013).

(Continued)

*Primary Examiner* — John Bedtelyon
(74) *Attorney, Agent, or Firm* — Thompson Hine LLP; Anthony Canale (57) ABSTRACT

Structures for an optical power splitter and methods of forming a structure for an optical power splitter. A first waveguide core includes a portion positioned over a multimode interference region, a second waveguide core includes a portion positioned over the multimode interference region, and a third waveguide core includes a portion positioned over the multimode interference region. The first waveguide core provides an input port to the optical power splitter. The second waveguide core provides a first output port from the optical power splitter, and the third waveguide core provides a second output port from the optical power splitter.

20 Claims, 9 Drawing Sheets

(56) References Cited

OTHER PUBLICATIONS

Malka, D.; Danan, Y.; Ramon, Y.; Zalevsky, Z. A Photonic 1 x 4 Power Splitter Based on Multimode Interference in Silicon-Gallium-Nitride Slot Waveguide Structures. Materials 2016, 9, 516.

Hai, M.S.; Leinse, A.; Veenstra, T.; Liboiron-Ladouceur, O. A Thermally Tunable 1 x 4 Channel Wavelength Demultiplexer Designed on a Low-Loss Si3N4 Waveguide Platform. Photonics 2015, 2, 1065-1080.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

\* cited by examiner

OPTICAL POWER SPLITTERS WITH A MULTIPLE-LEVEL ARRANGEMENT

BACKGROUND

The present invention relates to photonics chips and, more specifically, to structures for an optical power splitter and methods of forming a structure for an optical power splitter.

Photonics chips are used in many applications and systems, such as data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An optical power splitter is an optical component that is used in photonics chips to divide optical power between multiple waveguides with a desired coupling ratio. The same structure may be used as an optical power combiner that combines optical power received from multiple waveguides. Conventional optical power splitter/combiners tend to have a footprint that is larger than desirable and, in addition, may exhibit an insertion loss that is higher than desirable.

Improved structures for an optical power splitter and methods of forming a structure for an optical power splitter are needed.

SUMMARY

In an embodiment of the invention, a structure for an optical power splitter is provided. The structure includes a multimode interference region, a first waveguide core including a portion positioned over the multimode interference region, a second waveguide core including a portion positioned over the multimode interference region, and a third waveguide core including a portion positioned over the multimode interference region. The first waveguide core provides an input port to the optical power splitter, the second waveguide core provides a first output port from the optical power splitter, and the third waveguide core provides a second output port from the optical power splitter.

In an embodiment of the invention, a method of forming a structure for an optical power splitter is provided. The method includes forming a multimode interference region, forming a first waveguide core including a portion positioned over the multimode interference region, forming a second waveguide core including a portion positioned over the multimode interference region, and forming a third waveguide core including a portion positioned over the multimode interference region. The first waveguide core provides an input port to the optical power splitter, the second waveguide core provides a first output port from the optical power splitter, and the third waveguide core provides a second output port from the optical power splitter.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
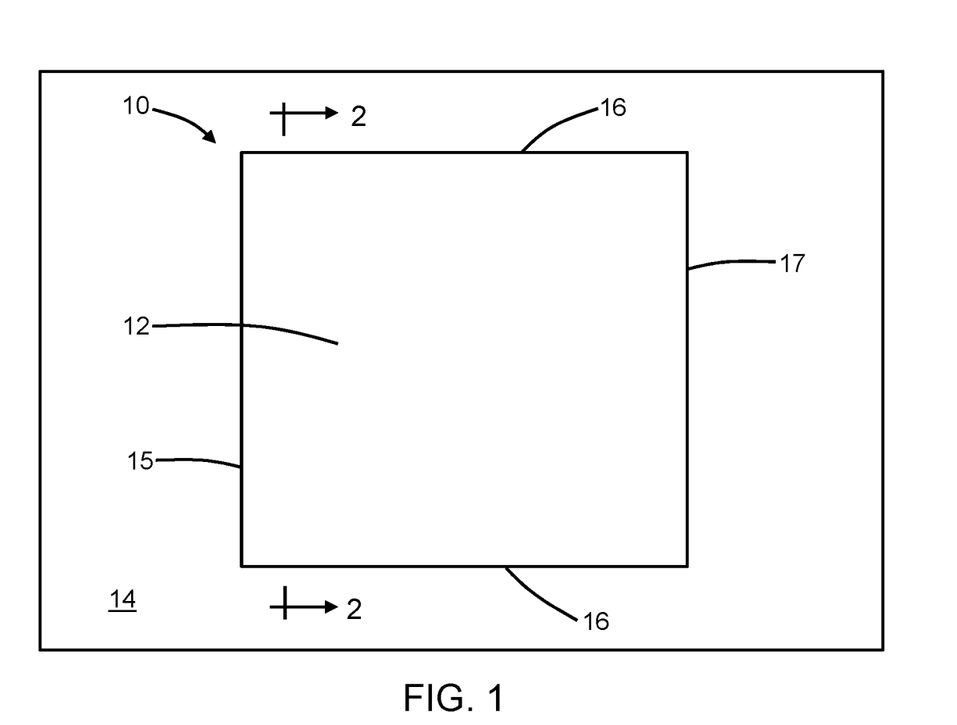
FIG. 1 is a top view of a structure at an initial fabrication stage of a processing method in accordance with embodiments of the invention.
Figure 2:
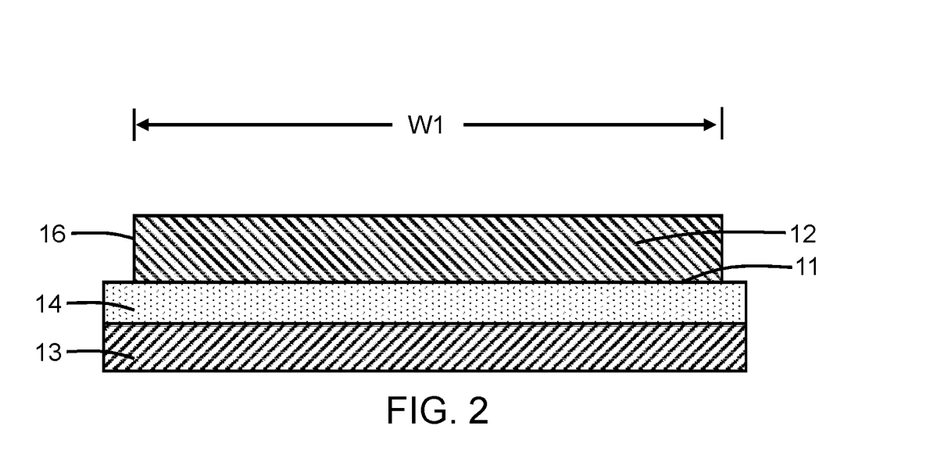
FIG. 2 is a cross-sectional view taken generally along line 2-2 in FIG. 1.

With reference to FIGS. 1, 2 and in accordance with embodiments of the invention, a structure 10 for a multimode optical power splitter includes a body or slab 12 that is positioned on a top surface 11 of a dielectric layer 14. The slab 12 may define a multimode interference region of the structure 10 that enables the optical power splitting. The slab 12 may be provided by a body having an outer perimeter that surrounds a closed geometrical shape. In an embodiment, the slab 12 may be rectangular or substantially rectangular in geometrical shape. The slab 12 includes opposite side surfaces 15, 17, as well as opposite side surfaces 16 that connect the side surface 15 to the side surface 17. The slab 12 may have a width dimension, W1, between the side surfaces 16.

The slab 12 may be comprised of a single-crystal semiconductor material, such as single-crystal silicon. In alternative embodiments, the slab 12 may be comprised of a different material. In an embodiment, the single-crystal semiconductor material may originate from a device layer of a silicon-on-insulator (SOI) substrate that further includes a buried oxide layer providing the dielectric layer 14 and a handle substrate 13 comprised of a single-crystal semiconductor material, such as single-crystal silicon. The slab 12 may be patterned from the device layer by lithography and etching processes. The device layer may be fully etched to define the slab 12 or, alternatively, only partially etched to define a thinned residual layer on the dielectric layer 14 and coupled to a lower portion of the slab 12 only at the side surfaces 16. The slab 12 may have a bottom surface coextensive with the top surface 11 of the dielectric layer 14 and an opposite top surface spaced in a vertical direction from the bottom surface.

Figure 3:
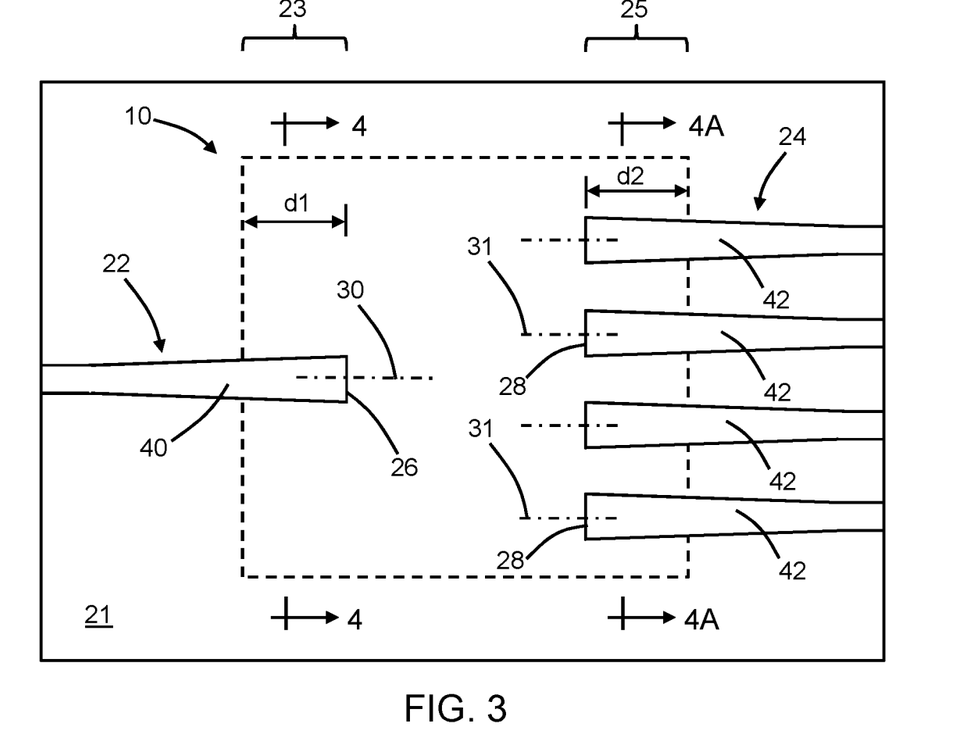
FIG. 3 is a top view of the structure at a fabrication stage of the processing method subsequent to FIG. 1.
Figure 4:
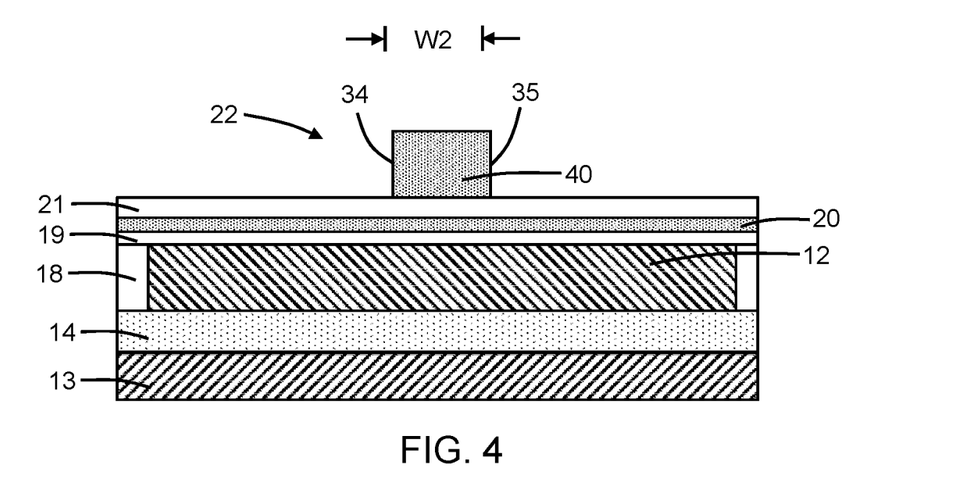
FIG. 4 is a cross-sectional view taken generally along line 4-4 in FIG. 3.
Figure 4A:
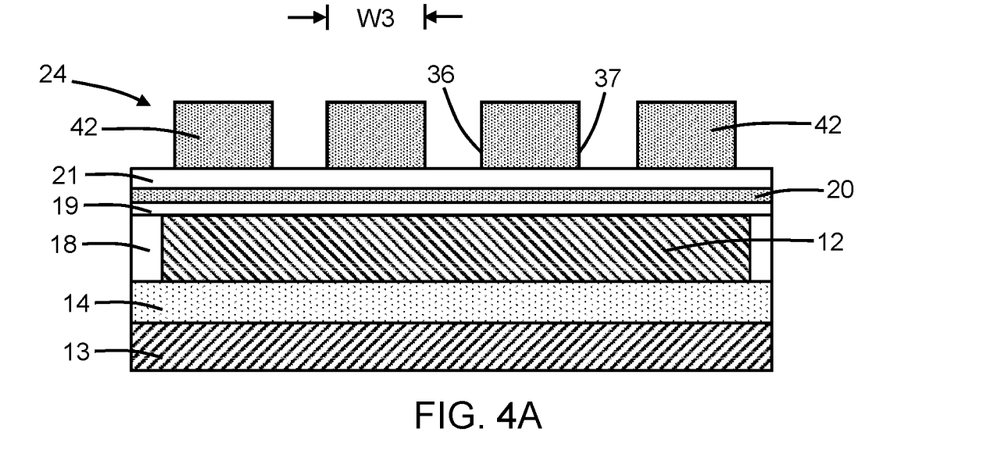
FIG. 4A is a cross-sectional view taken generally along line 4A-4A in FIG. 3.

With reference to FIGS. 3, 4, 4A in which like reference numerals refer to like features in FIGS. 1, 2 and at a subsequent fabrication stage, a dielectric layer 18 is formed over the slab 12 and the dielectric layer 14. The dielectric layer 18 may be comprised of a dielectric material, such as silicon dioxide, deposited by chemical vapor deposition and planarized with, for example, chemical-mechanical polishing to remove topography. The slab 12 is surrounded by the dielectric material of the dielectric layer 18, which provides low refractive-index cladding. Additional dielectric layers 19, 20, 21 may be deposited in a layer stack over the dielectric layer 18. The dielectric layer 20 may be comprised of silicon nitride, and the dielectric layers 19, 21 may be comprised of silicon dioxide. In an alternative embodiment, the dielectric layer 20 containing silicon nitride may be omitted from the layer stack. In an embodiment, the layer stack including the dielectric layers 19, 20, 21 may have a thickness that is less than or equal to 100 nanometers.

A waveguide core 22 and multiple waveguide cores 24 are formed on the dielectric layer 21. The waveguide cores 22, 24 may be formed by depositing a layer of their constituent material on the dielectric layer 18 and patterning the deposited layer with lithography and etching processes. The deposited layer may be fully etched to define the waveguide cores 22, 24 as shown or, alternatively, only partially etched to define a thinned residual layer on the dielectric layer 18 coupled to a lower portion of the waveguide core 22 and another thinned residual layer on the dielectric layer 18 coupled to a lower portion of the waveguide cores 24. In an embodiment, the waveguide cores 22, 24 may be comprised of a material having a different composition than the material contained in the slab 12. In an embodiment, the waveguide cores 22, 24 may be comprised of silicon nitride. In alternative embodiments, the waveguide cores 22, 24 may be comprised of a different material. In an embodiment, the waveguide cores 22, 24 may have a thickness that ranges from 50 nanometers to 500 nanometers.

The waveguide cores 22, 24 and the slab 12 are positioned in different layers or levels. Specifically, the waveguide cores 22, 24 are located in a level or layer that is positioned in a vertical direction within a different plane from the level or layer of the slab 12. The dielectric layers 19, 20, 21 are positioned as solid layers between the waveguide cores 22, 24 and the slab 12.

The waveguide core 22 may include a tapered section 40 that extends across the underlying side surface 15 of the slab 12 and that includes a portion 23 that overlaps with a portion of the multimode interference region defined by the slab 12. The tapered section 40 of the waveguide core 22 terminates at an end 26 that may be positioned above and over the slab 12. The portion 23 of the tapered section 40 therefore overlaps with a portion of the multimode interference region defined by the slab 12. The overlap distance, d1, of the portion 23 of the tapered section 40 with the slab 12 may be greater than or equal to the operational wavelength of the structure 10.

Each waveguide core 24 may include a tapered section 42 that extends across the underlying side surface 17 of the slab 12 and that includes a portion 25 that overlaps in part with the slab 12. The tapered section 42 of each waveguide core 24 terminates at an end 28 that may be positioned above and over the slab 12. The portion 25 of each tapered section 42 therefore overlaps with a portion of the multimode interference region defined by the slab 12. In each instance, the overlap distance, d2, of the portion 25 of the tapered section 42 with the slab 12 may also be greater than or equal to the operational wavelength of the structure 10.

The waveguide core 22 may provide an input port to the multimode interference region of the structure 10. The waveguide cores 24, which may provide multiple output ports for the optical power split by the multimode interference region, are positioned adjacent to each other with a juxtaposed, spaced-apart arrangement. In alternative embodiments, additional waveguide cores similar or identical to the waveguide core 22 may be provided as additional input ports. In alternative embodiments, additional waveguide cores similar or identical to the waveguide cores 24 may be provided as additional output ports.

The tapered section 40 of the waveguide core 22 tapers along a longitudinal axis 30 with a width dimension, W2, that decreases over its length with increasing distance from its terminating end 26. The width dimension, W2, may have a maximum width at the end 26. The waveguide core 22 has opposite sidewalls 34, 35 that are spaced by the width dimension, W2, and that terminate at the end 26. The tapered section 42 of each waveguide core 24 tapers along a longitudinal axis 31 with a width dimension, W3, that decreases over its length with increasing distance from its respective terminating end 28. The width dimension, W3, may have a maximum width at the end 28 of each portion 25. Each waveguide core 24 has opposite sidewalls 36, 37 that are spaced by the width dimension, W3, and that terminate at the end 28. The width dimension, W1, of the slab 12 is greater than either the width dimension, W2, or the width dimension, W3.

In an embodiment, the longitudinal axes 31 may be aligned parallel or substantially parallel to each other, and the longitudinal axis 30 may be aligned parallel or substantially parallel to the longitudinal axes 31. In an embodiment, the longitudinal axes 31 may be symmetrically positioned relative to the longitudinal axis 30. In an embodiment, the waveguide cores 24 may be symmetrically positioned relative to the waveguide core 22. In an embodiment, the waveguide cores 24 may be symmetrically positioned relative to the waveguide core 22, and the waveguide cores 22, 24 may be symmetrically positioned relative to the slab 12.

In an embodiment, the width dimension, W2, of the tapered section 40 and the width dimension, W3, of the tapered section 42 may vary based on a linear function. In an alternative embodiment, the width dimension, W2, of the tapered section 40 and/or the width dimension, W3, of the tapered section 42 may vary based on a non-linear function, such as a quadratic, parabolic, or exponential function.

The optical power splitter may have a more compact footprint in comparison with conventional optical power splitters due to the heterogenous layered configuration of the structure 10. The multiple materials and/or multiple levels of the structure 10 may promote a reduction in form factor for the optical power splitter. Multiple functions, namely coupling and interference, occur simultaneously within the structure 10 during use. The optical power splitter may be characterized by a relatively low insertion loss and a relatively low reflection in combination with the smaller form factor.

Figure 5:
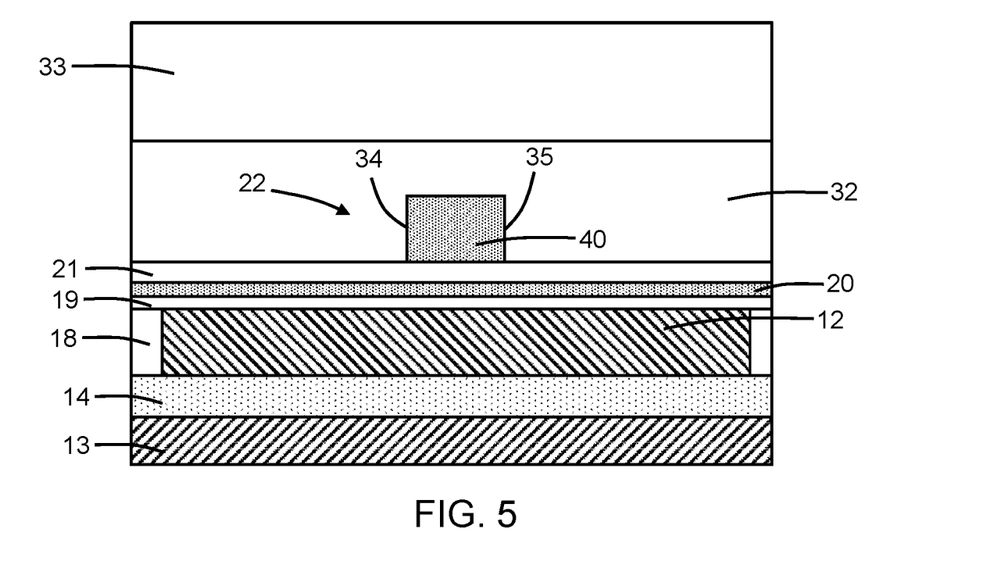
FIGS. 5, 5A are cross-sectional views of the structure at a fabrication stage of the processing method subsequent to FIGS. 4, 4A.
Figure 5A:
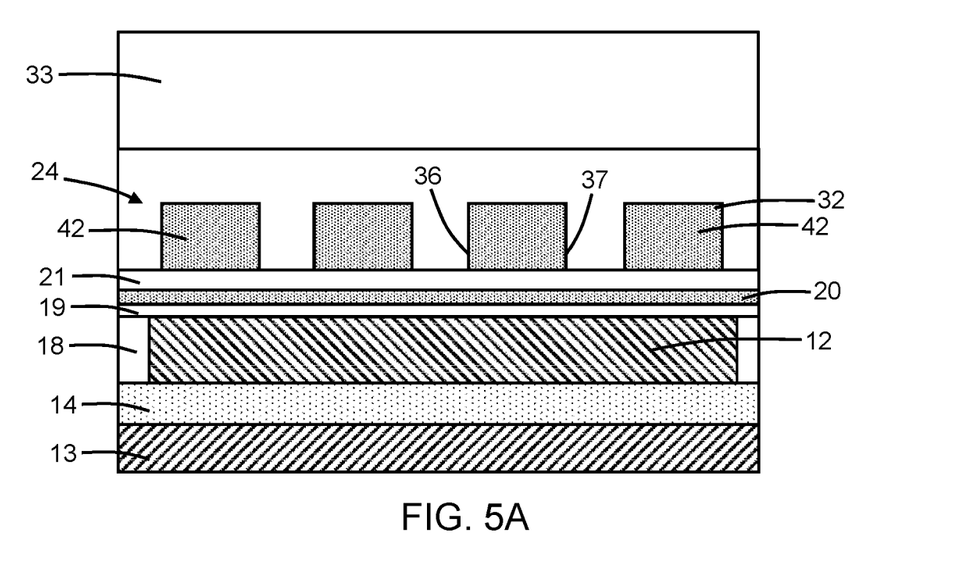

With reference to FIGS. 5, 5A in which like reference numerals refer to like features in FIGS. 4, 4A and at a subsequent fabrication stage, a dielectric layer 32 of a contact level is formed by middle-of-line processing over the waveguide cores 22, 24 and dielectric layer 21. The dielectric layer 32 may be comprised of dielectric material, such as silicon dioxide, deposited by chemical vapor deposition using ozone and tetraethylorthosilicate (TEOS) as reactants.

A back-end-of-line stack 33 may be formed by back-end-of-line processing over the dielectric layer 32. The back-end-of-line stack 33 may include one or more interlayer dielectric layers comprised of one or more dielectric materials, such as a silicon dioxide.

The structure 10, in any of its embodiments described herein, may be integrated into a photonics chip that may include electronic components and additional optical components in addition to the slab 12 and waveguide cores 22, 24. The electronic components may include, for example, field-effect transistors that are fabricated by CMOS processing using the device layer of the SOI substrate.

In use, laser light may be guided on the photonics chip by the waveguide core 22 from, for example, a fiber coupler or a laser coupler to the structure 10. The laser light is transferred by the multimode interference region defined by the slab 12 in a distributed manner to the waveguide cores 24.

Specifically, the optical power of the laser light is divided or split by the structure 10 into different fractions or percentages that are transferred from the waveguide core 22 to the different waveguide cores 24. The optical power of the laser light may be split equally or split substantially equally if the waveguide cores 24 are symmetrically arranged with respect to the waveguide core 22. Alternatively, the coupling ratio may be customized to differ from an equal or substantially equal split by asymmetrically arranging the waveguide cores 24 with respect to the waveguide core 22. The waveguide cores 24 separately guide the split laser light away from the structure 10. The spacing between the waveguide cores 24 may increase downstream from the structure 10 to eliminate interaction and crosstalk. Alternatively, the structure 10 may be used to combine the optical power of laser light received from the waveguide cores 24 for output by the waveguide core 22 to, for example, a photodetector or an optical modulator.

Figure 6:
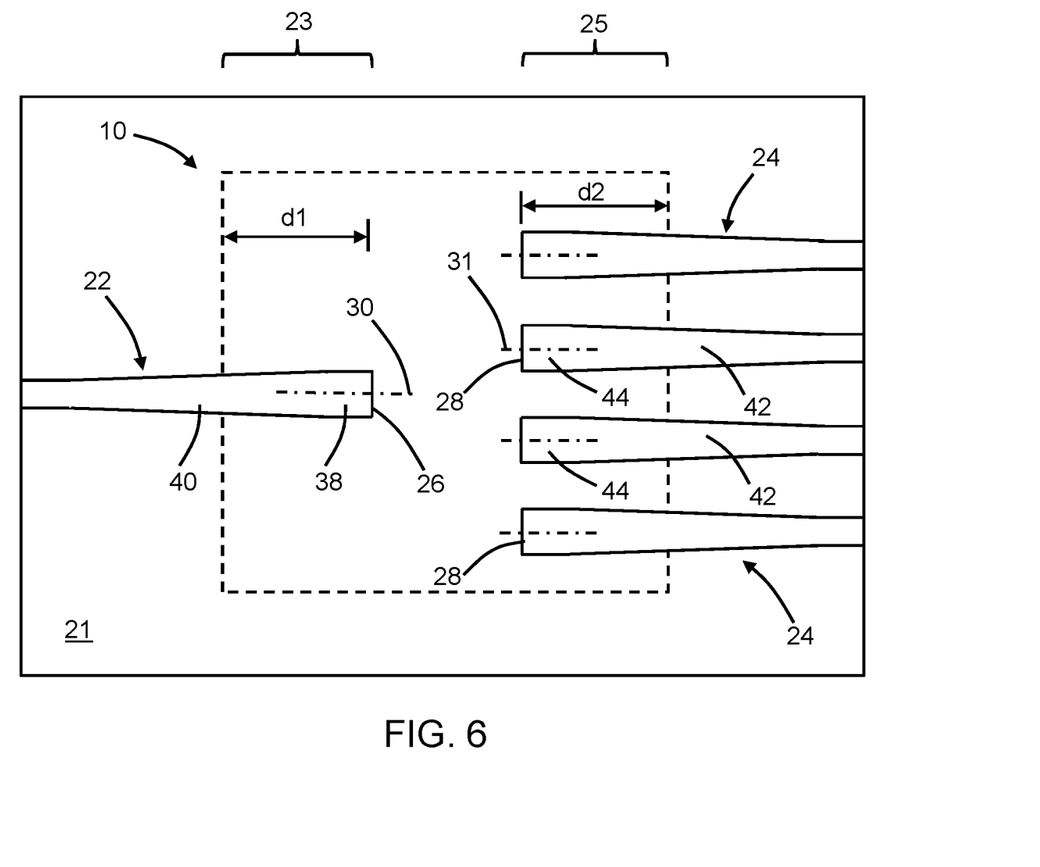
FIGS. 6-10 are top views of structures in accordance with alternative embodiments of the invention.

With reference to FIG. 6 and in accordance with alternative embodiments of the invention, the structure 10 may be modified such that the waveguide core 22 further includes a straight section 38 that is positioned over and overlaps with the slab 12 and that is included in the portion 23. The straight section 38 may be directly connected to the tapered section 40, and the straight section 38 may be aligned along the longitudinal axis 30 with the tapered section 40. In an embodiment, the straight section 38 may fully overlap with the slab 12, and the tapered section 40 may only partially overlap with the slab 12. The end 26 terminating the waveguide core 22 is repositioned to the added straight section 38.

The structure 10 may be further modified such that each waveguide core 24 further includes a straight section 44 that is positioned over and overlaps with the slab 12 and that is included in the portion 25. The straight section 44 may be directly connected to the tapered section 42, and the straight section 44 may be aligned along the longitudinal axis 31 with the tapered section 42. In an embodiment, the straight section 44 may fully overlap with the slab 12, and the tapered section 42 may only partially overlap with the slab 12. The end 28 terminating each waveguide core 24 is repositioned to the added straight section 44.

Figure 7:
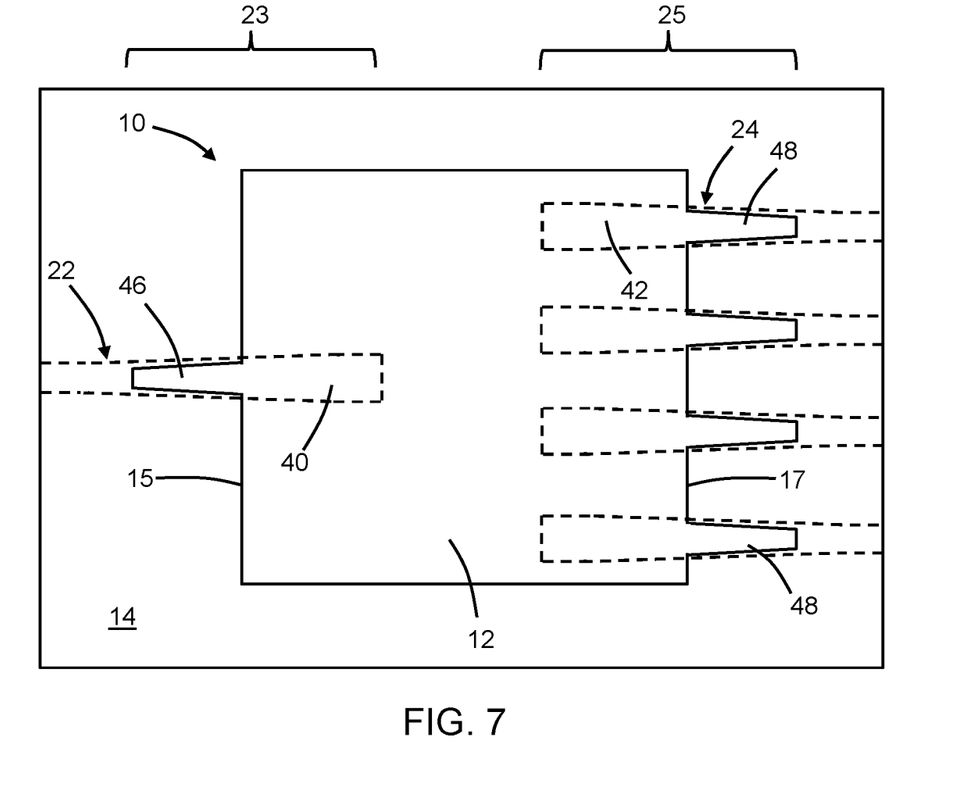

With reference to FIG. 7 and in accordance with alternative embodiments of the invention, the slab 12 may be modified to add a tapered section 46 that projects laterally from the side surface 15 and to also add tapered sections 48 that project laterally from the side surface 17. The tapered section 46 may be positioned beneath the tapered section 40 of the waveguide core 22, and one of the tapered sections 48 may be positioned beneath the tapered section 42 of each waveguide core 24. The addition of the tapered section 46 to the slab 12 may function to increase the overlap between the slab 12 and the tapered section 40 of the waveguide core 22, and, therefore, increase the extent of the portion 23. Similarly, the addition of the tapered sections 48 to the slab 12 may function to increase the overlap between the slab 12 and the tapered section 42 of each waveguide core 24 and, therefore, increase the extent of the portion 25. The tapered sections 46, 48 may be inversely tapered relative to the tapering of the tapered sections 40, 42 and may be narrower in width than the tapered sections 40, 42.

Figure 8:
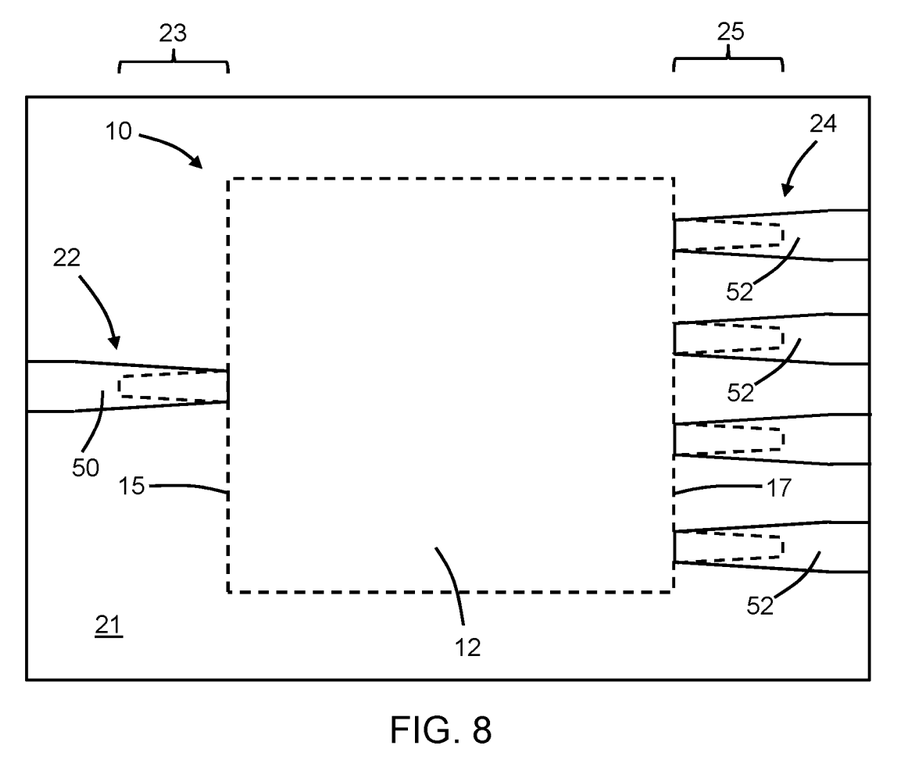

With reference to FIG. 8 and in accordance with alternative embodiments of the invention, the structure 10 may be modified to add the tapered sections 46, 48 to the slab 12, and the waveguide cores 22, 24 may be modified to include tapered sections 50, 52. The tapered section 50, 52, which replace the tapered sections 40, 42, have inverse tapering relative to the tapered sections 40, 42. The slab 12 and tapered sections 46, 48 are diagrammatically shown in dashed lines in FIG. 8. In that regard, the tapered section 46 may be positioned beneath and overlap with the tapered section 50 of the waveguide core 22 to provide the overlapping portion 23, and the tapered section 50 of the waveguide core 22 may terminate at or approximately at the side surface 15 of the slab 12. Similarly, one of the tapered sections 48 may be positioned beneath and overlap with the tapered section 52 of each waveguide core 24 to provide the overlapping portion 25, and the inversely-tapered tapered section 52 of each waveguide core 24 may terminate at or approximately at the side surface 17 of the slab 12.

Figure 9:
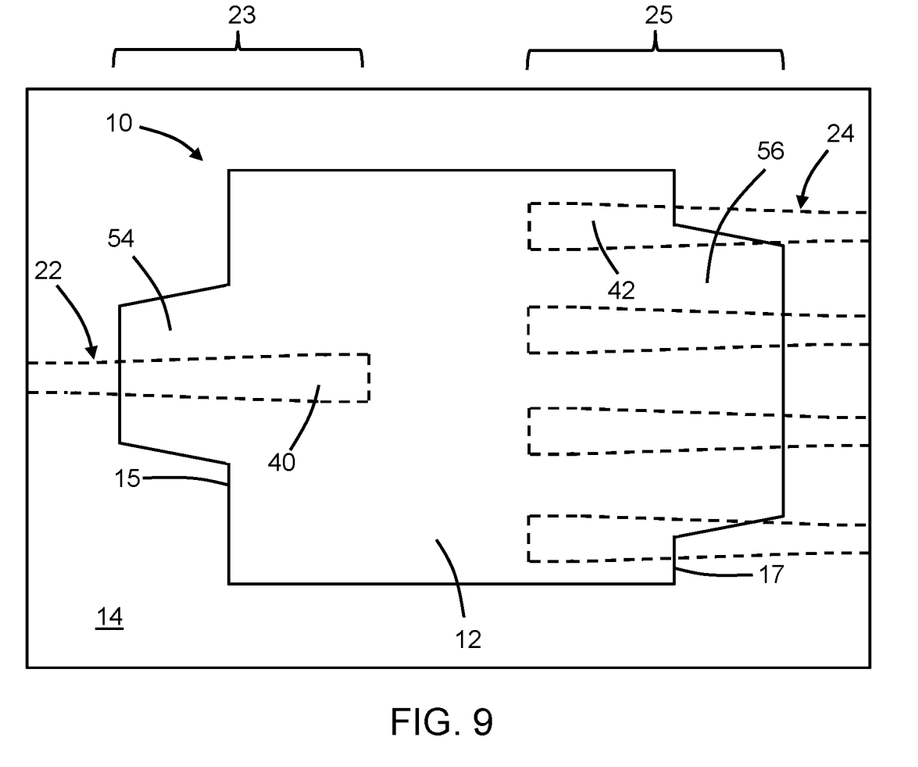

With reference to FIG. 9 and in accordance with alternative embodiments of the invention, the slab 12 may be modified to add a tapered section 54 that projects from the side surface 15 and to add a tapered section 56 that projects from the side surface 17. The tapered section 40 of the waveguide core 22 overlaps in part with the tapered section 54, and is significantly narrower than the tapered section 54 to provide the portion 23. The tapered section 42 of one or more of the waveguide cores 24 overlaps in part with the tapered section 56 to provide respective overlapping portions 25. In an embodiment, the tapered section 42 of more than one waveguide core 24 overlaps in part with the tapered section 56.

Figure 10:
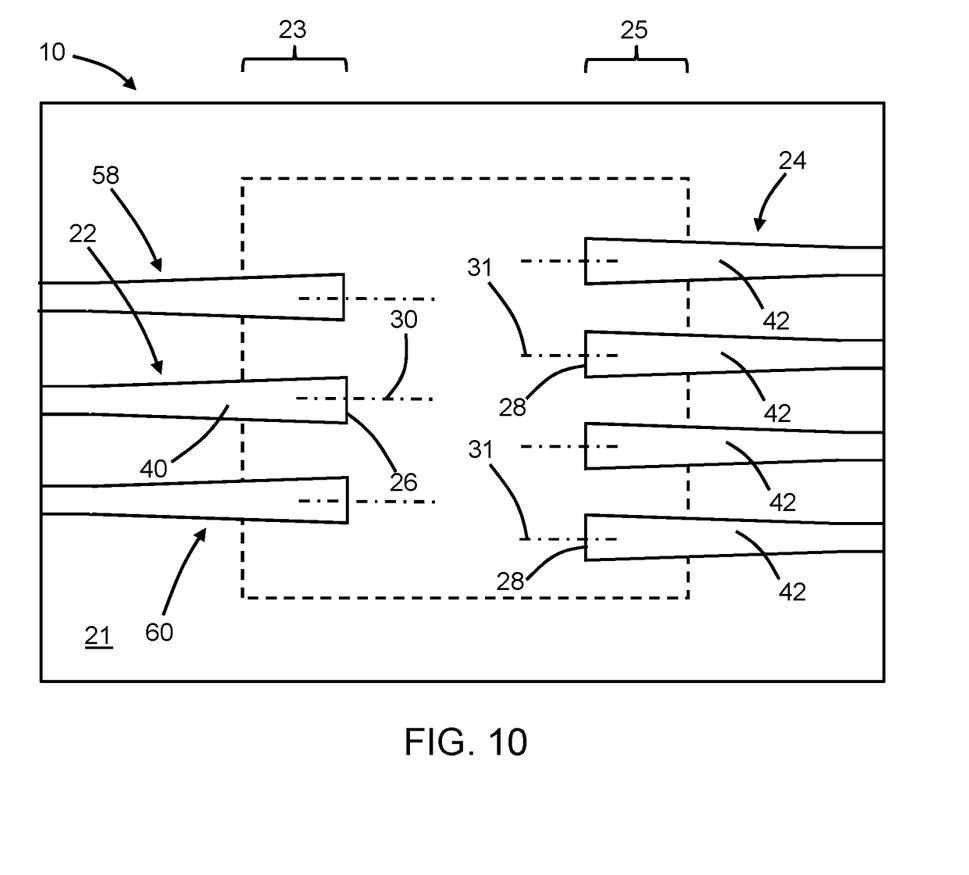

With reference to FIG. 10 and in accordance with alternative embodiments of the invention, the structure 10 may be modified to add waveguide cores 58, 60 that provide additional input ports to the multimode interference region provided by the slab 12. Each of the added waveguide cores 58, 60 may be constructed substantially similar or identical to the waveguide core 22. The waveguide cores 22, 58, 60 may be symmetrically positioned at the side surface 15 and may also be symmetrically positioned relative to the waveguide cores 24.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical power splitter, the structure comprising:
    a multimode interference region;
    a first dielectric layer over the multimode interference region;
    a first waveguide core on the first dielectric layer, the first waveguide core including a portion positioned over the multimode interference region, and the first waveguide core providing a first input port to the optical power splitter;
    a second waveguide core on the first dielectric layer, the second waveguide core including a portion positioned over the multimode interference region, and the second waveguide core providing a first output port from the optical power splitter; and
    a third waveguide core on the first dielectric layer, the third waveguide core including a portion positioned over the multimode interference region, and the third waveguide core providing a second output port from the optical power splitter,
    wherein the multimode interference region is located in a first level, the first waveguide core, the second waveguide core, and the third waveguide core are located in a second level, the second level is positioned in a vertical direction within a different plane than the first level, and the first dielectric layer is positioned as a solid layer between the multimode interference region in the first level and the first waveguide core, the second waveguide core, and the third waveguide core in the second level.

2. The structure of claim 1 wherein the multimode interference region is a slab having a first side surface and a second side surface opposite to the first side surface, the first waveguide core is positioned to extend across the first side surface, and the second waveguide core and the third waveguide core are positioned to extend across the second side surface.

3. The structure of claim 2 wherein the slab includes a tapered section extending from the first side surface, and the portion of the first waveguide core is positioned in part over the tapered section.

4. The structure of claim 2 wherein the portion of the first waveguide core is a tapered section having a terminating end positioned over the slab.

5. The structure of claim 2 wherein the slab includes a first tapered section and a second tapered section extending from the second side surface, the portion of the second waveguide core is positioned in part over the first tapered section, and the portion of the third waveguide core is positioned in part over the second tapered section.

6. The structure of claim 2 wherein the portion of the second waveguide core is a tapered section having a terminating end positioned over the slab, and the portion of the third waveguide core is a tapered section having a terminating end positioned over the slab.

7. The structure of claim 2 wherein the slab includes a tapered section extending from the second side surface, the portion of the second waveguide core and the portion of the third waveguide core are positioned in part over the tapered section.

8. The structure of claim 1 wherein the second waveguide core is positioned adjacent to the third waveguide core, and the portion of the first waveguide core is symmetrically positioned relative to the portion of the second waveguide core and the portion of the third waveguide core.

9. The structure of claim 1 wherein the multimode interference region is comprised of a first material, and the first waveguide core, the second waveguide core, and the third waveguide core are comprised of a second material that differs in composition from the first material.

10. The structure of claim 9 wherein the first material comprises single-crystal silicon, and the second material comprises silicon nitride.

11. The structure of claim 9 further comprising:
    a first layer of the second material on the first dielectric layer, the first layer of the second material coupled to a lower portion of the first waveguide core; and
    a second layer of the second material on the first dielectric layer, the second layer of the second material coupled to a lower portion of the second waveguide core and a lower portion of the third waveguide core.

12. The structure of claim 1 further comprising:
    a fourth waveguide core on the first dielectric layer, the fourth waveguide core including a portion positioned over the multimode interference region, and the fourth waveguide core providing a second input port to the optical power splitter.

13. The structure of claim 12 wherein the multimode interference region is a slab having a side surface, the first waveguide core and the fourth waveguide core are positioned to extend across the side surface, and the portion of the fourth waveguide core is positioned adjacent to the portion of the first waveguide core.

14. The structure of claim 1 wherein the portion of the first waveguide core is a tapered section having a terminating end positioned over the multimode interference region.

15. The structure of claim 1 wherein the portion of the second waveguide core is a tapered section having a terminating end positioned over the multimode interference region, and the portion of the third waveguide core is a tapered section having a terminating end positioned over the multimode interference region.

16. The structure of claim 1 further comprising:
    a second dielectric layer positioned as a solid layer between the multimode interference region in the first level and the first waveguide core, the second waveguide core, and the third waveguide core in the second level, wherein the first dielectric layer and the second dielectric layer comprise different dielectric materials.

17. A method of forming an optical power splitter, the method comprising:
forming a multimode interference region;
forming a dielectric layer over the multimode interference region;
forming a first waveguide core on the dielectric layer, wherein the first waveguide core includes a portion positioned over the multimode interference region, and the first waveguide core provides an input port to the optical power splitter;
forming a second waveguide core on the dielectric layer, wherein the second waveguide includes a portion positioned over the multimode interference region, and the second waveguide core provides a first output port from the optical power splitter; and
forming a third waveguide core on the dielectric layer, wherein the third waveguide core includes a portion positioned over the multimode interference region, and the third waveguide core provides a second output port from the optical power splitter,
wherein the multimode interference region is located in a first level, the first waveguide core, the second waveguide core, and the third waveguide core are located in a second level, the second level is positioned in a vertical direction within a different plane than the first level, and the dielectric layer is positioned as a solid layer between the multimode interference region in the first level and the first waveguide core, the second waveguide core, and the third waveguide core in the second level.

18. The method of claim 17 wherein the multimode interference region is a slab having a first side surface and a second side surface opposite to the first side surface, the first waveguide core is positioned to extend across the first side surface, the second waveguide core is positioned adjacent to the third waveguide core, and the second waveguide core and the third waveguide core are positioned to extend across the second side surface.

19. The method of claim 17 wherein the multimode interference region is comprised of a first material, and the first waveguide core, the second waveguide core, and the third waveguide core are comprised of a second material that differs in composition from the first material.

20. The method of claim 17 wherein the portion of the first waveguide core is a tapered section having a terminating end positioned over the multimode interference region, the portion of the second waveguide core is a tapered section having a terminating end positioned over the multimode interference region, and the portion of the third waveguide core is a tapered section having a terminating end positioned over the multimode interference region.

* * * * *